United States Patent [19]

Gohlisch et al.

[11] Patent Number: 5,061,166
[45] Date of Patent: Oct. 29, 1991

[54] EXTRUDER HEAD

[75] Inventors: Hans-Joachim Gohlisch, Hanover; Wilfried Baumgarten, Pattensen; Klaus Becker, Sibbesse; Paul Budiman, Hanover, all of Fed. Rep. of Germany

[73] Assignee: Paul Troester Maschinenfabrik, Hanover, Fed. Rep. of Germany

[21] Appl. No.: 551,934

[22] Filed: Jul. 12, 1990

[30] Foreign Application Priority Data

Jul. 14, 1989 [DE] Fed. Rep. of Germany ....... 3923290

[51] Int. Cl.⁵ .............................................. B29C 47/14
[52] U.S. Cl. .................................. 425/133.5; 425/188; 425/462
[58] Field of Search ................... 425/188, 192 R, 380, 425/133.5, 462, 466

[56] References Cited

U.S. PATENT DOCUMENTS

| | | | |
|---|---|---|---|
| 3,488,807 | 1/1970 | Vossen | 425/192 R |
| 3,535,738 | 10/1970 | Vossen | 425/192 R |
| 3,902,835 | 9/1975 | Theysohn | 425/380 |
| 4,137,027 | 1/1979 | Rüger | 425/188 |
| 4,358,261 | 11/1982 | Ohki | 425/133.5 |
| 4,652,224 | 3/1987 | Golisch | 425/466 |
| 4,653,994 | 3/1987 | Capelle | 425/188 |
| 4,781,560 | 11/1988 | Herbert | 425/133.5 |
| 4,799,874 | 1/1989 | Bellmer et al. | 425/133.5 |
| 4,892,473 | 1/1990 | Elia et al. | 425/462 |

Primary Examiner—Jay H. Woo
Assistant Examiner—William J. Matney, Jr.
Attorney, Agent, or Firm—Robert E. Burns; Emmanuel J. Lobato

[57] ABSTRACT

An extruder head for producing profiles of rubber and/or plastic mixtures has a stationay main part which has a forward face in which the discharge ends of at least two extruders, rigid with the stationary main part open. The stationary main part has a transverse pivot shaft at one side of the forward face and, at the side opposite the pivot shaft, an abutment which projects forwardly of the forward face. A movable main part is pivoted, with play, on the pivot shaft and is swingable between a closed position in which it overlies the forward face and an open position. An extrusion die unit is disposed between the outboard end of the movable main part and the abutment. Flow channels between the movable main part and the stationary main part lead from the extruders to the extrusion die unit. Hydraulically operated clamps hold the movable main part in closed position and a hydraulic servo motor exerts on the movable main part a force parallel to the forward face of the stationary main part and directed toward the abutment. In one embodiment, there are two movable main parts pivoted at opposite sides of the stationary main part and having an extrusion die unit between them.

19 Claims, 6 Drawing Sheets

EXTRUDER HEAD

The invention relates to an extruder head for the production of profiles from different kinds of rubberand/or plastic mixtures, which are pressed out of several extruders, comprising a main part connected fast with the cylinder of the extruder and at least one movable main part with a plane or obtuse division surface between them, with which a flow channel extends through the division surface and at least one part of another flow channel lies in or on this division surface, and a device for producing a closing force for pressing the main parts together as well as a locking mechanism for holding the movable main part or parts together with the fixed main part.

An extruder head of this kind is known from Golisch U.S. Pat. No. 4,652,224. This extruder head is characterized particularly by its low production cost and the short simple flow channels from the screw tip to the finished profile bar. The low production cost stems from the simple production possibility of the plane division surface between the movable main part or parts and the fixed main part of this extruder head. But also the operation and the cleaning are essentially facilitated through this construction with plane division surfaces. The down-time is hereby significantly reduced.

The sealing of the extrusion die in front of the outlet of the injection head, which lies between the clamped-together front head parts is, with this known construction of the extruder head, problematic, when working with very high mass pressures, which is, for example, the case when considerable decomposition work is to be carried out in the extruder. The problem arising here is further increased in that the hydraulic cylinder for swinging the movable part must at the same time provide the force for pressing the movable part against the fixed part. With very high mass pressures in the interior of the extruder and with insufficiently large dimensions for the hydraulic cylinder, leakage can occur.

From Theysohn U.S. Pat. No. 3,902,835 it has become known, in a wide extruder head, to connect the movable part and the swingable part together through swingable clamps which are pressed in their clamping position by a hydraulic-piston-cylinder unit. Such clamps enable considerably greater forces to be applied than those exerted by the hydraulic-piston-cylinder-unit for moving them. However, through their use, the problem of providing a satisfactory sealing of the extrusion die in this construction is not solved.

The invention eliminates the disadvantages of the state of the art. It is the object of the invention to seal the extruder head with simple means while avoiding over-dimensioned force elements and to achieve an effective sealing of the extrusion die. Also the extrusion dies should be interchangeable without total opening and cleaning of the extruder head.

The invention consists therein that a device for production of a force component acting on a movable main part in a direction parallel to the division surface is arranged on the fixed main part, and that the locking devices are designed as wedge-form clamps.

It is hereby attained, that all parts of the extruder head are satisfactorily sealed, including the extrusion die. The required means are structurally simple and also simple to operate. The sealing is also satisfactory with the highest mass pressure. The advantages of the aforementioned extruder head according to DE 34 27 022 are thereby preserved while eliminating the disadvantages.

It is advantageous when hydraulic servo motors, preferably piston-cylinder-units, for producing the force components acting on the movable main parts in a direction parallel to the division plane are arranged on the fixed main part. Hydraulic servo motors easily apply the forces required to press the parts of the extruder head tightly to one another.

In one embodiment of the invention, the construction is so designed that the hinged support of the movable main part has sufficient play for movement of the movable main part along the division surface. This construction is distinguished by great simplicity. As the bolt-bore-tolerance can be coarse, this construction leads to an inexpensive manner of production.

Another possibility of the construction is that the movable main part comprises two parts which are connected with one another through guides running parallel to the division plane. This construction is, of course, more expensive but is characterized by a considerably precision.

Another possibility of the clamping is that the fixed main part and the movable main part have lateral projections which are embraced by the wedge-form clamp.

A possibility of obtaining the force components in the direction of the division plane simultaneously with the clamping consists therein that the wedgeshaped clamp has a recess which is dove-tail in cross section and the projections have cross sections of half dove-tail. With this form of construction of the clamp, but also other forms of construction, the structurally simple solution is thereby attained that the clamp is swingable about, and longitudinally slidable on, an axis of rotation.

For the processing of a wide variety of materials of different profiles, it is advantageous when the movable part is provided with an insert plate having the flow profile on which the force components parallel to the division plane act.

The sealing then becomes especially simple when a half of the preliminary shaping die is secured on the insert plate.

BRIEF DESCRIPTIONS OF DRAWINGS

The essence of the invention will be more fully explained in the following description of embodiments shown schematically in the accompanying drawings in which.

DESCRIPTION OF PREFERRED EMBODIMENTS

Figure 1:
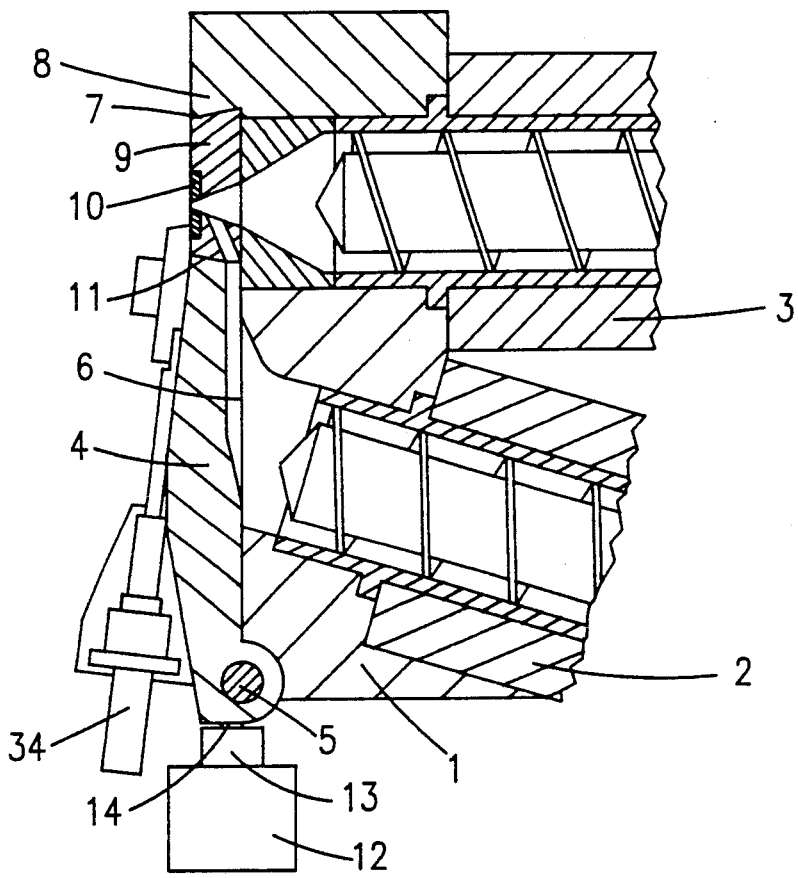
FIG. 1 is a vertical longitudinal section through an extruder head for an extrusion unit provided with two extruders.
Figure 2:
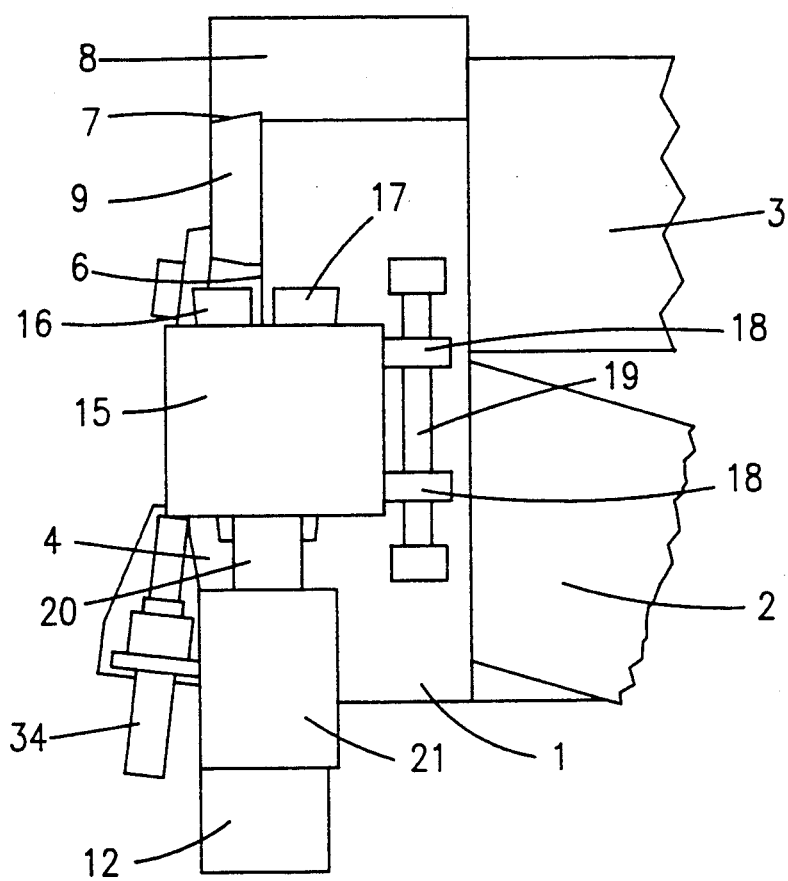
FIG. 2 is a side elevation of this extruder head in closed condition.
Figure 3:
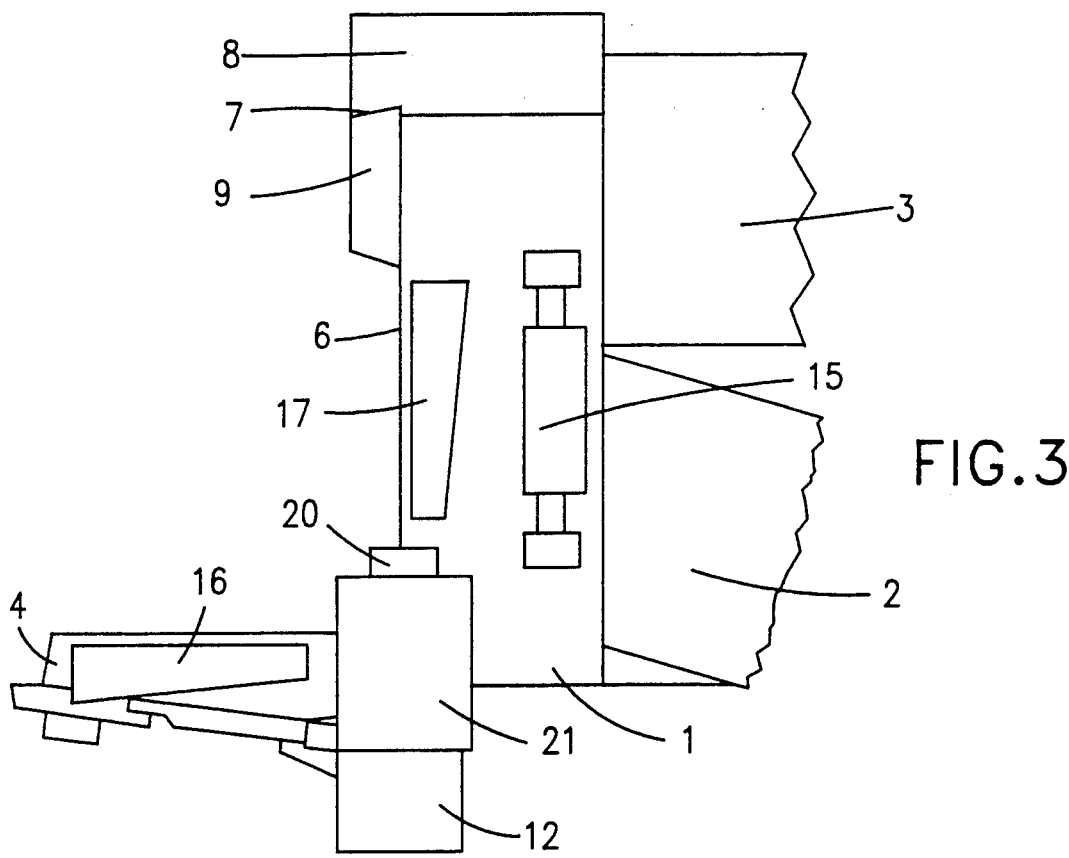
FIG. 3 is a side elevation of this extruder head in open condition.
Figure 4:
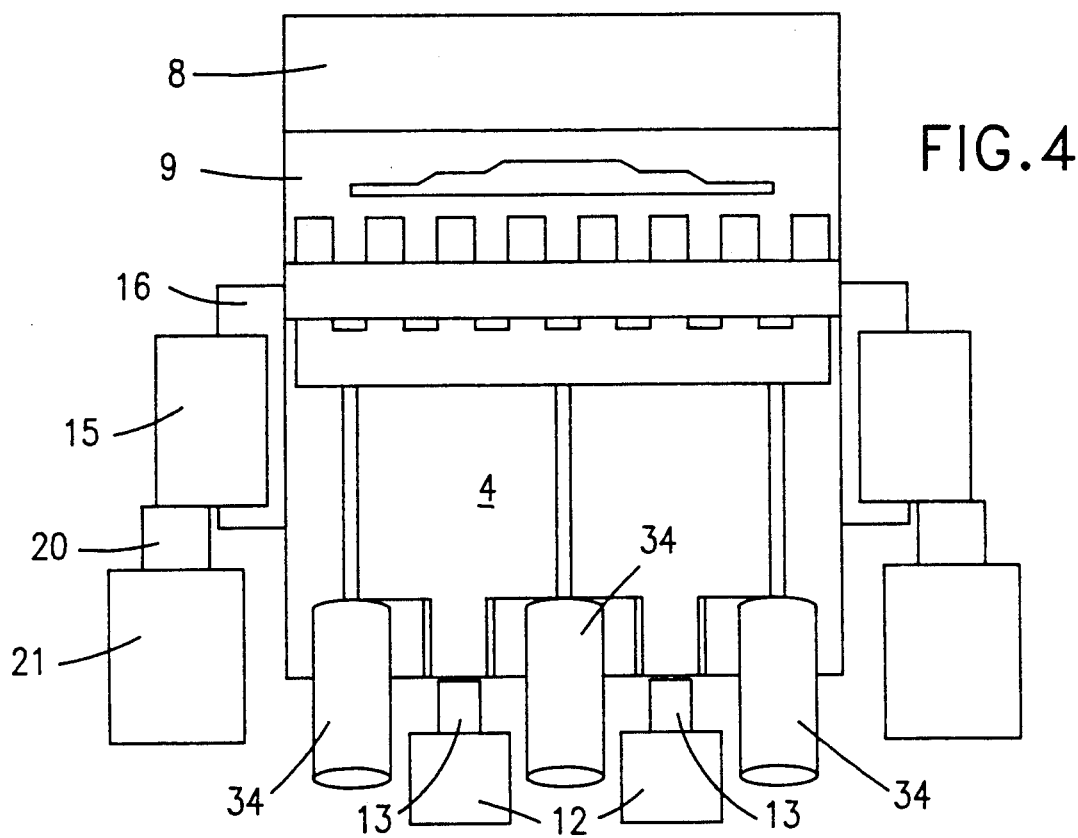
FIG. 4 is a front elevation.
Figure 5:
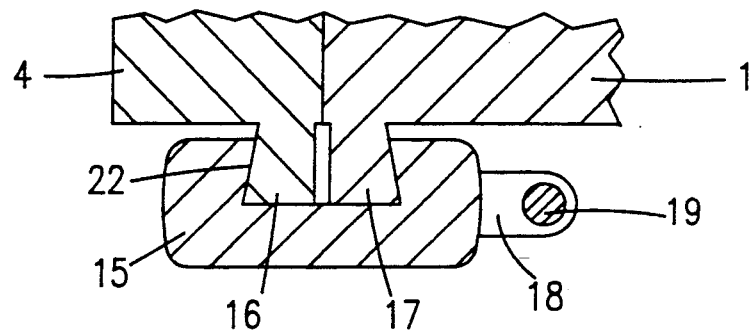
FIG. 5 is a section through the clamp and the projections formed on main parts of the extruder head.
Figure 6:
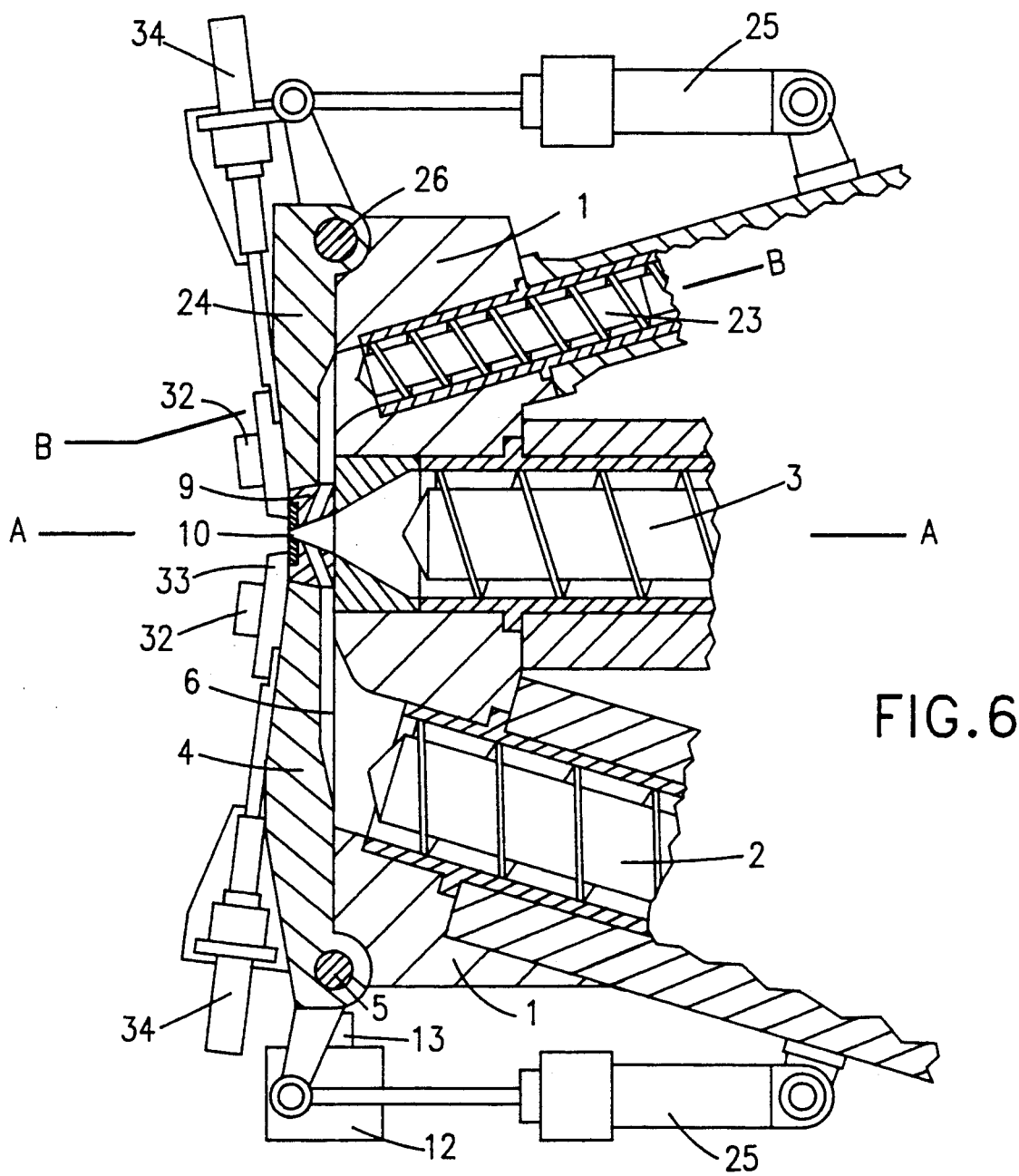
FIG. 6 is a vertical longitudinal section through an extruder head for an extrusion unit provided with three extruders.
Figure 7:
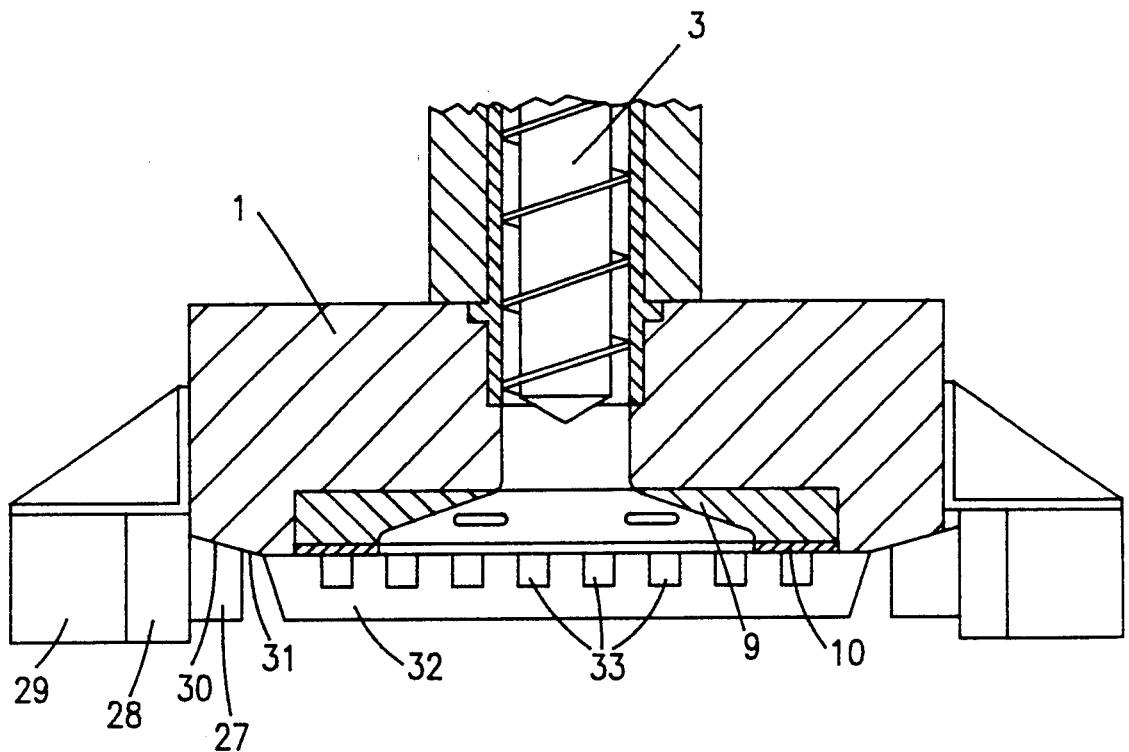
FIG. 7 is a section taken on the line A—A in FIG. 6.
Figure 8:
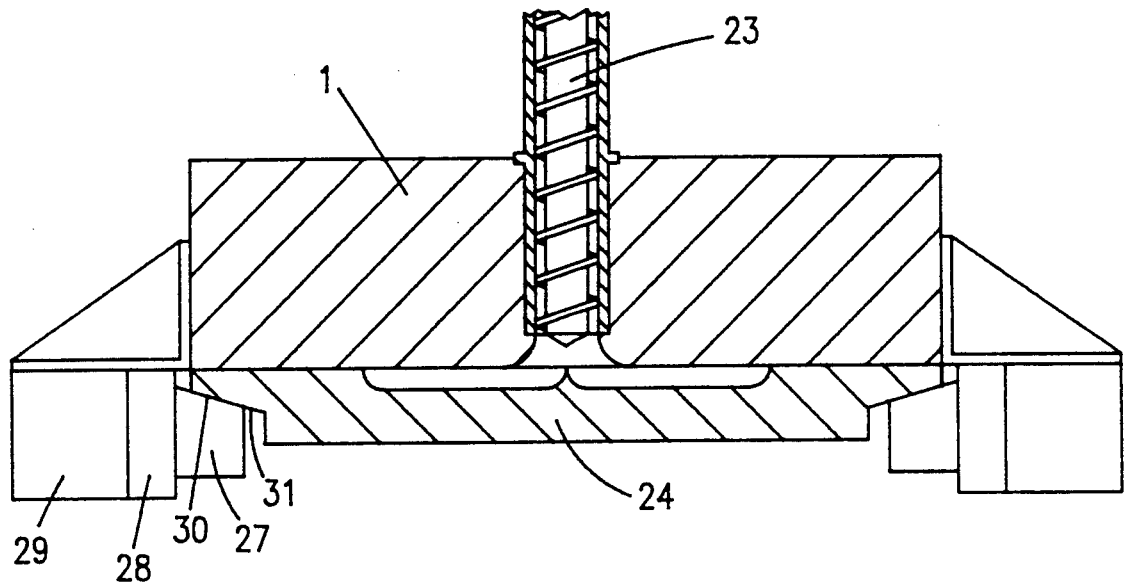
FIG. 8 is a section taken on the line B—B in FIG. 6.
Figure 9:
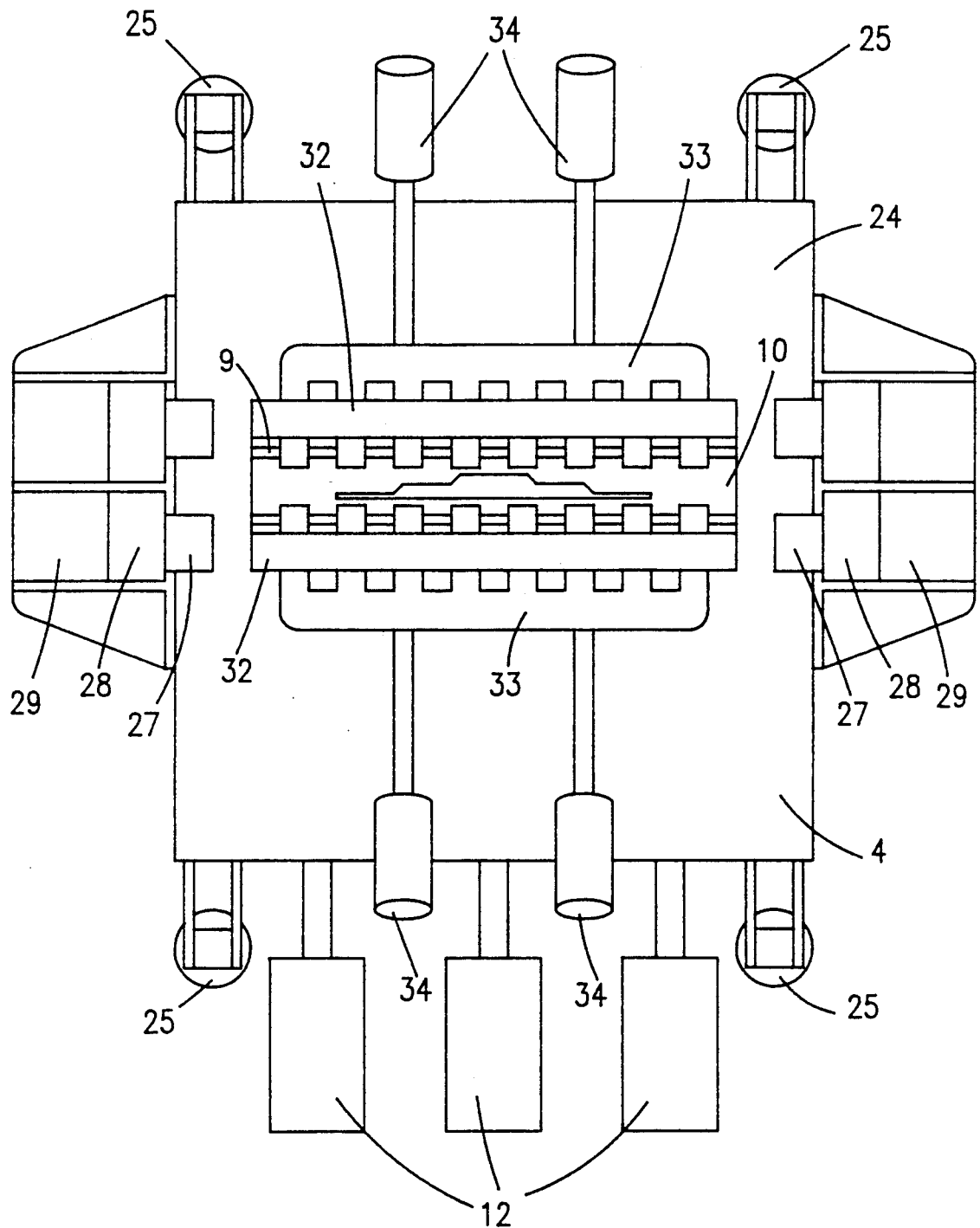
FIG. 9 is a front elevation of this extruder in closed condition.

The extruder head of FIGS. 1 to 5 comprises a stationary main part 1, on which the extruders 2 and 3 are fixedly flanged, and a movable main part 4 which is swingable about a shaft 5. The swinging of the movable main part 4 about the shaft 5 is effected by servo motors (not shown) preferably in the form of hydraulic piston-cylinder-units or a hydraulic rotary drive. The surface of division surface 6 between the stationary and main part 1 and the movable main part 4 is a plane. On the side turned away from the shaft 5, the stationary main part 1 has a projection 8 on which is arranged an abutment surface 7 which is preferably perpendicular to the division surface 6 and on which is mounted a preliminary shaping die 9 which accommodates the extrusion die 10. One side surface of the preliminary shaping die 9 lies on the abutment surface 7 while the opposite side surface is engaged by the end surface 11 of the movable main part 4. Underneath the movable main part 4 there is arranged a hydraulic piston-cylinder-unit 12 of which the piston rod 13 is movable sufficiently that it engages the pressure surface 14 of the movable main part 4, upon pressure fluid being supplied to the cylinder, and exerts on the movable main part 4 a force parallel to the division surface 6, which presses the end face 11 against the preliminary shaping die 9 and presses the preliminary shaping die 9 against the abutment surface 7. This is made possible in that in the pivot formed by the shaft 5 there is sufficient play so that this movement for sealing the preliminary shaping die is made possible.

The movable main part 4 is held on the stationary main part 1 by clamps 15. These clamps grip projections 16 on the sides of the movable main part 4 and projections 17 on the stationary main part 1. These projections are spaced a certain distance from one another. The projections 16, 17 as well as the engaging faces of the clamp 15 are inclined in wedge form to one another so that the interengaging faces between the projections 16, 17 and the clamp 15 are arranged parallel to one another. The clamps 15 have lugs forming pivot parts 18 which embrace a shaft 19. This shaft 19 is formed sufficiently long that a sliding of the pivot parts 18 along the shaft 19 is possible. In their clamping position, the clamps 15 are pressed by the pressing cylinders 20 of the hydraulic servo motors (hydraulic-piston-cylinderunits) 21. With suitable coupling of these pressing cylinders 20 with the clamps 15, the same servo motors 21 can also serve to release the clamps 15.

Advantageously, the recesses 22 of the clamps 15 which embrace the projections 16, 17 are of dove tail form while the projections 16, 17 are half dove tail in cross section.

In the embodiment of FIGS. 6 to 10, the extrusion apparatus has three extruders 2, 3 and 23. These three extruders 2, 3 and 23 are flanged fast on the stationary main part 1 of the extruder head. This extruder head has two movable main parts 4 and 24, which clamp the preliminary shaping die 9 between them. Hydraulic servo motors 25 serve for swinging these two movable parts 4, 24. The lower movable part 4 is swingable about a shaft 5 on the stationary main part 1 while the upper movable main part 24 is swingable about a shaft 26 on the stationary main part 1. The bearings of the upper movable main part 24 on the shaft 26 have relatively limited play, while the shaft 5 with which the movable main part 4 is pivotally connected with the stationary main part 1 has relatively great play so that the servo motor 12 can press the end of the movable main part 4 against the preliminary shaping die 9 and press the preliminary shaping die 9 against the end face of the movable main part 24. The movable main parts 4, 24 are pressed against the division plane 6 of the stationary main part 1 by means of clamps in the form of slides 27 which are slidable in holders or guides 28 by hydraulic servo motors 29 and with their wedge surfaces 30 engage parallel surfaces 31 on the outer side of the movable main parts 4, 24.

The extrusion die 10 together with the preliminary shaping die 9 are clamped in a direction perpendicular to the division plane by sliders 33 which are slidable in guideways 32 by means of servo motors 34.

Figure 10:
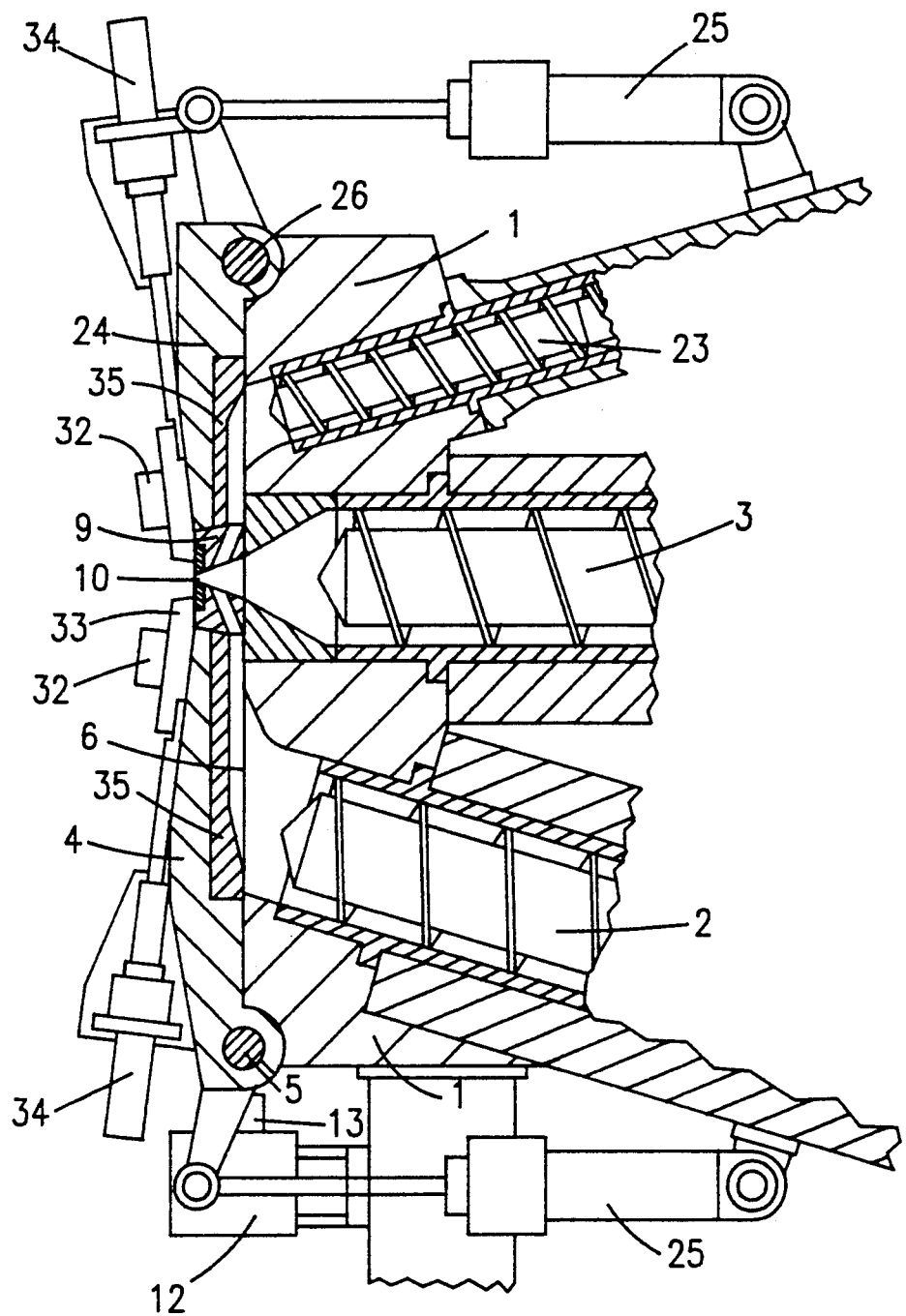
FIG. 10 is a section through a similar extruder with a flow-channel-forming insert.

In the embodiment illustrated in FIG. 10 the movable main parts 4, 24 are provided with recesses to receive insert plates 35 in which flow channels are formed. These plates 35 can be fitted to the preliminary shaping die halves 9 or can be integral therewith. The mechanism for producing a force component parallel to the division plane 6 can, in a modified arrangement, also act directly on the one plate 35.

What we claim is:

1. Extrusion apparatus for producing profiles from a plurality of rubber and/or plastic mixtures, comprising
a stationary main part having a plane forward face, a transverse pivot shaft at one side of said forward face and a fixed abutment at an opposite side of said forward face, said fixed abutment projecting forwardly of said forward face,
a movable main part swingable about said pivot shaft between a closed position overlying said forward face of said stationary main part and an open position, said movable main part having an end which, in closed position, is spaced from said fixed abutment of said stationary main part,
an extrusion die unit positioned between said end of said movable main part and said fixed abutment of said stationary main part, said stationary main part and said movable main part defining a flow space between said movable main part and said forward face of said stationary main part for flow of extruded material from said extruders to said extrusion die unit,
means for clamping said movable main part in closed position, and
means for exerting a force on said movable main part in a direction parallel to said forward face of said stationary main part to press said movable main part toward said fixed abutment of said stationary main part and thereby clamp said extrusion die unit between said movable main part and said fixed abutment, there being sufficient play between said pivot shaft and said movable main part to permit movement of said movable main part parallel to said forward face of said stationary main part.

2. Apparatus according to claim 1, in which said force exerting means comprises a hydraulic piston-cylinder unit.

3. Apparatus according to claim 2, in which said piston-cylinder unit comprises a cylinder mounted on said stationary main part and a piston having a piston rod engaging said movable main part.

4. Apparatus according to claim 1, in which said clamping means comprises lateral projections on said stationary main part, adjacent lateral projections on said movable main part, said lateral projections having wedge surfaces, a clamping member having a recess receiving said projections, said recess having wedge surfaces engageable with said wedge surfaces of said projections, and means for moving said clamping member relative to said projections to wedge said projections of said movable main part toward said projections of said stationary main part.

5. Apparatus according to claim 4, in which said clamping members are swingable about pivot shafts between operative positions for engaging said projections and inoperative positions.

6. Apparatus according to claim 5, in which said clamping members are slidable on said pivot shafts and in which said means for moving said clamping members comprise hydraulic piston-cylinder units.

7. Apparatus according to claim 6, in which each of said hydraulic piston-cylinder units comprises a cylinder mounted on said stationary main part and a piston having a piston rod engaging the respective clamping member.

8. Apparatus according to claim 4, in which main recess of said clamping member is of dove tail shape and said projections are half dove tail shape in cross section.

9. Apparatus according to claim 1, in which said extrusion die unit comprises a preliminary shaping die and an extrusion die, said extrusion die seating in a recess in said preliminary shaping die and being removable therefrom, and in which a slider on said movable main part is engageable with said extrusion die to retain said extrusion die in said recess of said preliminary shaping die.

10. Apparatus according to claim 9, further comprising a servo motor for sliding said slider between an extrusion die retaining position and an extrusion die releasing position.

11. Apparatus for extruding profiles from rubber and/or plastic mixtures comprising
    a stationary main part having a plane forward face,
    at least two extruders rigid with said stationary main part and having discharge ends opening in said forward face,
    two transverse pivot shafts disposed respectively at opposite sides of said forward face of said stationary main part,
    two movable main parts mounted pivotally on said two pivot shafts respectively for pivotal movement between a closed position in which said movable main parts overlie said forward face of said stationary main part and an open position,
    an extrusion die unit disposed between outboard ends of said movable main parts when in closed position,
    inner faces of said movable main parts and said forward face of said stationary main part defining flow channels for flow of material from discharge ends of said extruders to said extrusion die unit,
    means for swinging said movable main parts between open position and closed position,
    means for clamping said movable main parts when in closed position, against said forward face of said stationary main part and
    means for exerting on one of said movable main parts, when in closed positions, a force parallel to said forward face of said stationary main part to press one movable main part toward the other movable main part to clamp said extrusion die unit between ends of said movable main parts, there being sufficient play in the pivotal mounting of said one movable main part to permit movement of said one movable main part parallel to said forward face of said stationary main part, while the pivotal mounting of said other movable main part has only relatively limited play.

12. Apparatus according to claim 11, in which said clamping means comprises sliders slidable on said stationary main part and having wedge surfaces engaging wedge surfaces on said movable main parts, and servo motors for sliding said sliders.

13. Apparatus according to claim 11, further comprising inserts received in recesses on inner sides of said movable main parts and cooperating with said forward face of said stationary main part to define flow passages from said extruders to said extrusion die unit.

14. Apparatus according to claim 11, in which said means for exerting on said one movable main part a force parallel to said forward face of said stationary main part comprises a hydraulic servo motor mounted on said stationary main part at the side of said forward face adjacent said pivot shaft of said one movable main part.

15. Apparatus according to claim 11, in which there are three extruders of which a central extruder opens into said extrusion die unit.

16. Apparatus according to claim 11, in which said extrusion die unit comprises a preliminary shaping die and an extrusion die.

17. Apparatus according to claim 16, in which said extrusion die is removably received in a recess in said preliminary shaping die, and in which sliders on said movable main parts are slideable between a position in which said sliders retain said extrusion die in said recess in said preliminary shaping die and a position in which said extrusion die is released for removable from said recess.

18. Apparatus according to claim 17, further comprising servo motor means on said movable main parts for sliding said sliders between said extrusion die retaining position and said extrusion die releasing position.

19. Apparatus according to claim 11, in which said movable main parts have laterally projecting arms and in which said means for swinging said movable main parts between open position and closed position comprise hydraulic servo motors pivotally mounted on said stationary main part and coupled with said arms of said movable main parts.

* * * * *